United States Patent [19]
Martinez

[11] Patent Number: 5,353,833
[45] Date of Patent: Oct. 11, 1994

[54] GATE VALVE LOCKING ARRANGEMENT

[75] Inventor: Louis Martinez, 3521 Summerdale St., Corona, Calif. 91719

[73] Assignee: Louis Martinez, Corona, Calif.

[21] Appl. No.: 141,271

[22] Filed: Oct. 22, 1993

Related U.S. Application Data

[63] Continuation-in-part of Ser. No. 41,674, Apr. 1, 1993.

[51] Int. Cl.⁵ ............................................. F16K 35/02
[52] U.S. Cl. ..................... 137/385; 70/177; 70/212
[58] Field of Search ............... 70/177, 180, 212; 137/385

[56] References Cited

U.S. PATENT DOCUMENTS

| 1,924,831 | 8/1933 | Bockman | 70/180 |
|---|---|---|---|
| 2,161,626 | 6/1939 | Loughner et al. | 70/180 |
| 2,324,633 | 7/1943 | McCarthy et al. | 70/180 |
| 2,390,972 | 12/1945 | Weinberg | 70/180 |
| 4,397,332 | 8/1983 | Sample | 70/177 |

FOREIGN PATENT DOCUMENTS 912517 7/1949 Fed. Rep. of Germany ...... 137/385

Primary Examiner—A. Michael Chambers
Attorney, Agent, or Firm—Beehler & Pavitt

[57] ABSTRACT

A gate valve locking arrangement in which a steel bracket is clamped on a portion of the truss extending upwardly from the valve bonnet and supporting the gate valve spindle and wheel, the bracket having a rigid bar extending upwardly and capped by a L-shaped member seating against the inside of the wheel. The bracket may be secured in a fixed portion relative to the wheel by a cylindrical lock having a recess into which the vertical portion of the L-shaped member is inserted and locked, or by a padlock in certain applications.

6 Claims, 3 Drawing Sheets

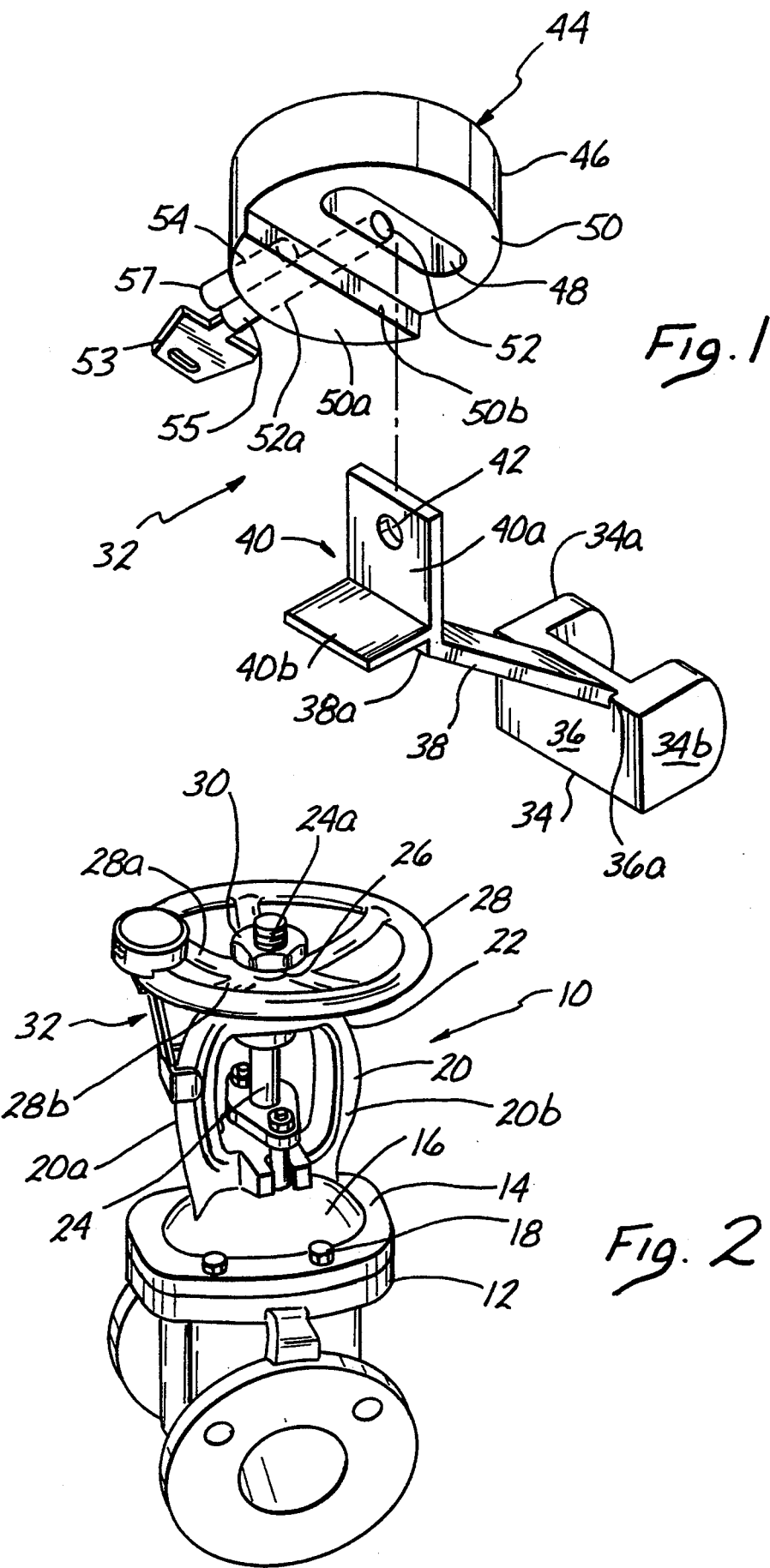

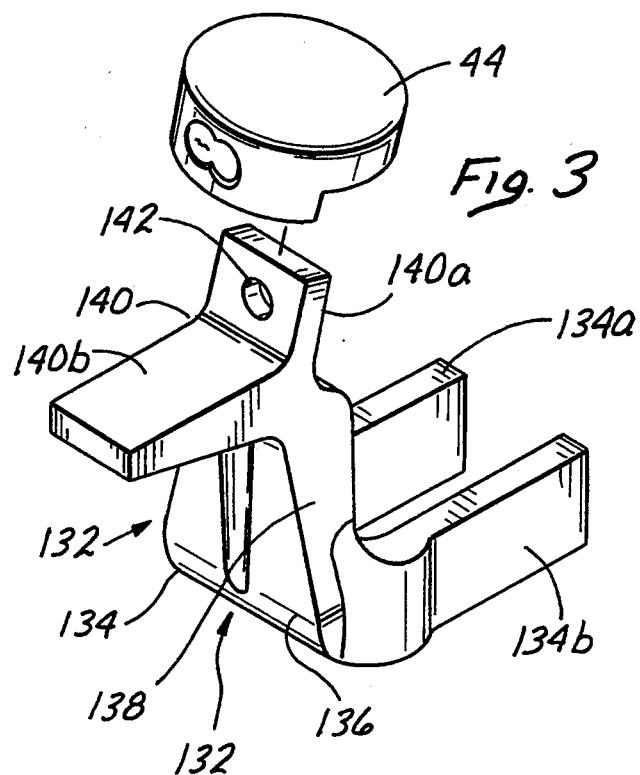
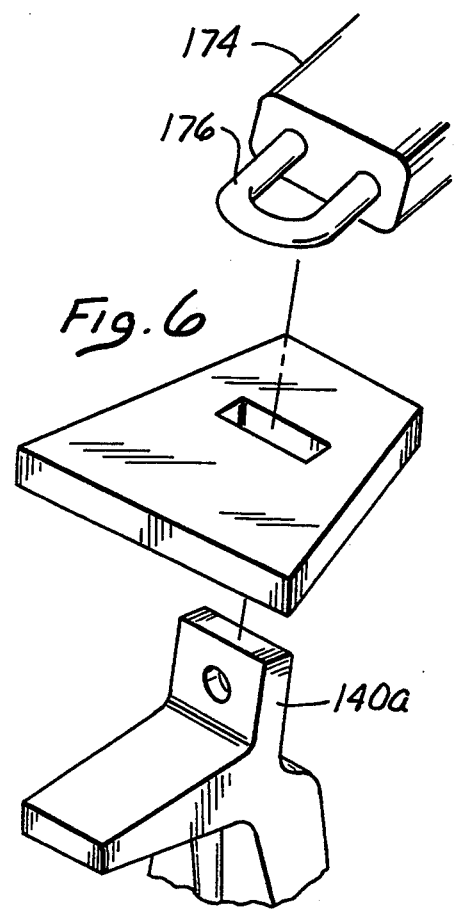
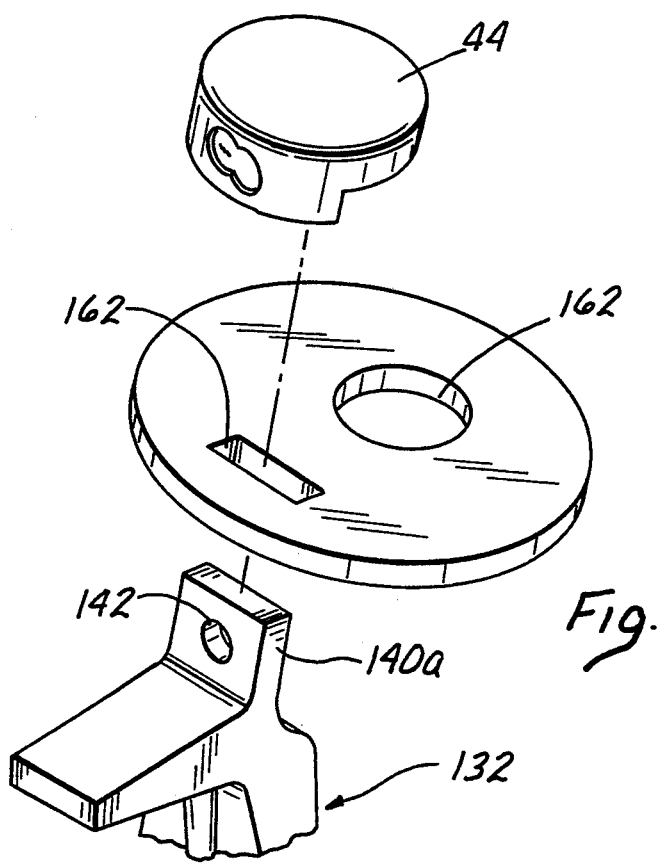

GATE VALVE LOCKING ARRANGEMENT

This application is a continuation-in-part of application Ser. No. 08/041,674 Apr. 1, 1993.

BACKGROUND OF THE INVENTION

1. Field of the Invention

This invention relates to locking systems in general, and specifically to a locking arrangement to secure gate valves against tampering.

2. Description of the Prior Art

Gate valves have long been, and are today, extensively used to control the flow of fluids frequently under high pressure. Among such uses for gate valves would be controlling the flow through pipes of steam, oil, water, gas, and other fluids. Such valves are used at selected points on pipelines, in plants and to control the flow of water into buildings and other facilities. It is generally most desirable to secure a gate valve which is being used in a preset position and, for this purpose, the wheel of the gate valve is often secured to the truss support or other stationary portion of the valve by means of a chain and padlock. Unfortunately, it seems to have been a great temptation to certain people, or even organizations, to tamper with the settings of gate valves and to do so, the chain may be cut or the staple of a padlock may be sawed. Quite frequently, tampering with a gate valve to the extent of changing its setting, even to the point of shutting it off completely, or opening a valve wide may produce disastrous consequences. For example, if the flow of water to a building should be shut off, none of its automatic sprinklers may work with the result that there would be no automatic suppression of a fire which may be started in any of the building offices. In the situation of a pipeline conducting the flow of oil or water, shutting a gate valve may result in shutting down pumps or even damage to pumps which are not provided with means to respond to a stoppage of the fluid flow. In recently filed patent application of the present invention, Ser. No. 08/020,197, there is illustrated and described a use of the novel lock of that application to an arrangement for locking a gate valve. The embodiment shown in that application, however, would require welding of a lock to the bonnet or ring securing the bonnet of the valve.

SUMMARY OF THE PRESENT INVENTION

The present invention utilizes an available cylindrical lock and avoids the necessity of having to weld the lock to the bonnet or other stationary portion of a standard gate valve. The type of gate valve to which the arrangement of the present invention is particularly applicable, is one in which the wheeled upper end of the valve spindle and the spindle are supported by a U-shaped truss, the base ends of which are welded or otherwise secured to the bonnet of the valve and the apex of which truss is orificed to pass the spindle therethrough and onto the upper end of which spindle is mounted the turning wheel. To secure the wheel against tampering or unauthorized turning, the present invention utilizes a special bracket which has a stationary U-shaped jaw base in which jaw at least one side member of the truss, or both side members, may be gripped or embraced. Extending upwardly and/or angularly outwardly from the jaw base and either welded to the latter, or molded unitarily therewith, is a rigid bar to the upper end of which is welded or molded unitarily therewith, an outwardly facing L-shaped member to fit against the inside and underside of a sector of the turning wheel of the valve. The vertical side of the L-shaped member extends a short distance above such inside of the sector of the turning wheel and is orificed near its upper edge. The width of the L-shaped member is such as to permit it to be inserted in the orifice of a well-known cylindrical lock with its orifice being alignable for register with the locking pin of such lock. By bringing the lock down over the upper end of the L-shaped member, in one embodiment, with the underside lock shelf placed in abutment with the opposite outside of the sector of the wheel abutted by the vertical part of the L-shaped member, when the locking pin of the cylindrical lock is aligned in register with the orifice in the upper part of the L-shaped member and pushed through and locked and the key removed, it will be found that the turning wheel is effectively secured against any, but the slightest, turning in either direction, at least no more than the distance between the wheel spokes.

In another embodiment of the invention, where the vertical portion of the bracket may be unitarily molded with the jaw base and at a lesser angle relative to the latter, the vertical side of the L-shaped member may pass radially inwardly of the circular wheel rim and between the wheel spokes where the cylindrical lock may be brought down on the vertical side wall of the L-shaped member to secure the wheel adjacent its center section from which the spokes radiate, in the same locking manner as for the embodiment first described.

In a still further embodiment of the invention, the molded bracket may be employed with a wheel cover plate to lock the valve against unauthorized turning of the valve wheel.

In addition, for certain applications where it is necessary to provide a padlock which can be cut to permit fire or emergency crews to turn the valve wheel, the molded bracket and a wedge with a padlock may be employed.

The advantage of this arrangement is not only the ease with which the locking member may be slipped on to one side of the U-shaped truss and against the inside of the turning wheel, but the ability to use a standard, readily available lock such as that made by the American Lock Company.

BRIEF DESCRIPTION OF THE DRAWINGS

In the accompanying drawings,

FIG. 1 is an exploded view in perspective of the two locking components.

FIG. 2 is a perspective view of a gate valve showing the manner in which its turning wheel may be secured against tampering by use of the components shown in FIG. 1.

FIG. 3 is a perspective view of a unitarily molded bracket and a cylindrical lock to be utilized therewith.

FIG. 6 is a partial perspective exploded view similar to FIG. 3a wherein a slotted wedge is provided for the wheel and a padlock is applied to that part of the bracket vertical wall which projects through a slot in the wedge.

FIG. 7 is a perspective exploded view similar to FIG. 3, but showing a disk interposed between the bracket and the cylindrical lock.

DESCRIPTION OF THE PREFERRED EMBODIMENT

Figure 4:
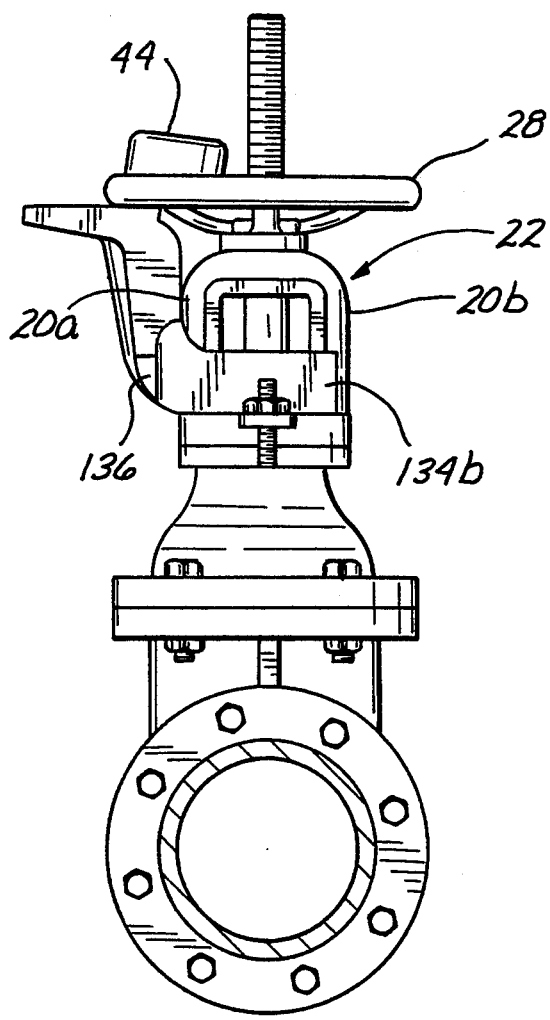
FIG. 4 is a side elevation of a gate valve secured by the bracket and cylindrical lock shown in FIG. 3.

FIG. 2 depicts a standard gate valve 10 which is mounted on a valve housing 12 by a ring 14 securing the valve bonnet 16 by bolts 18. Extending upwardly from the bonnet 16 is a U-shaped supporting truss 20 which has an orifice (not shown) at the top of the U of the truss 22 through which the valve spindle 24 projects to receive the orificed center 26 of the turning wheel 28. The wheel 28 is held on the top 24a of the spindle 24 by the locking nut 30.

To secure the wheel 28 against unwanted turning, the locking combination comprised of a bracket 32 and lock 44, the details of which are shown in FIG. 1, is employed. This bracket 32 comprises a jaw base 34 having a transverse wall 36 from each end of which are projected a pair of gripping side walls 34a and 34b. A bar 38 is welded to the upper edge 36a of the wall 36 to project upwardly and angularly outwardly from the wall 36 as shown in FIG. 1. An L-shaped member 40 is welded to the upper end 38a of the bar 38. This member 40 is formed of a vertical walled portion 40a and a horizontal shelf portion 40b projecting outwardly from the base of the wall portion 40a. An orifice 42 is provided in and toward the upper end of the vertical wall 40a. A cylindrical lock 44 preferably may be one which has been made and sold by the American Lock Company. The lock 44 comprises a cylindrical body 46 having a slot-like recess 48 which extends from its lower face 50 toward the opposite face (not shown) of the cylindrical body 46. The face 50 has a rising segment or shelf 50a which is parallel to the elongated slotlike recess 48. The lock body 46 also has a small transverse radially extending passage 52. The radially outward portion 52a of the passage fuses with a parallel lock pin receiving orifice 50. The lock 44 is of the type which may be currently found in many hardware stores and per se is not an invention of the present applicant. It is, however, one of the components of the present inventive combination.

In use, the side walls 34a and 34b and of the jaw base 34 are brought around one of the side members 20a and 20b of the truss 20, and the member 32 is then slipped upwardly until the shelf 40b of the L-shaped member 40 presses against the underside of the wheel 28 and the vertical wall 40a against the inside of the wheel 28 and extends above the latter. The slotter orifice 48 of the lock 44 is then aligned with the vertical wall 40a of the L-shaped member 40 and brought down to seat the slot 48 on the vertical wall 40a to where the passage 52 is disposed in register with the orifice 42 in wall 40a. The vertical wall 50b of the shelf portion 50a then presses against the outside of the wheel 28. With this alignment, the key 53 in the pin 55 is then pushed into the orifice 52 to where the pin 55 enters the orifice 58 and passes through the orifice 42 in the wall 40a. Turning and removing the key 53 then results in the lock pin 57 being disposed in the locking orifice 54, and the lock being secured on the vertical wall 40a so that the segment of the wheel 28 which is covered by the lock 44 is gripped between the shelf 50b of the lock face 50 and the vertical wall 40a of the L-shaped member 40. In this disposition, it will be found that the wheel 28 will become unturnable or, at most, turnable only between adjacent wheel spokes 28a and 28b.

If the bracket 32 is formed of heavy steel pieces welded together, when thus coupled with the cylindrical lock 44, turning of or tampering with the wheel 28 will be found to be impossible, short of actually destroying the valve assembly itself.

In the embodiments of FIGS. 3–7 of the drawings, a unitarily molded bracket 132 formed of cast aluminum or other strong moldable metal is provided in the place of the bracket 32 illustrated and discussed in connection with the embodiment of the invention of FIGS. 1 and 2. It may be seen particularly from FIG. 3 that the molded bracket comprises a jaw base 134 having a transverse wall 136 from each end of which extends a gripping side wall 134a and 134b. It will be noted that these gripping walls 134a and 134b are considerably longer than the corresponding walls 34a and 34b in the FIG. 1 embodiment. The purpose of these longer walls 134a and 134b is to enable them to embrace both of the side members 20a and 20b of the truss 22 as shown in FIG. 4.

The bracket 132 further includes an upwardly extending portion 138 capped by the L-shaped member 140. This L-shaped member 140 is formed with a vertical wall portion 140a and a horizontal shelf portion 140b projecting outwardly from the base of the vertical wall portion 140a, similar to what appears in the FIG. 1 embodiment, but in a generally much heavier molded metallic structure, and orifice 142 is provided in and toward the upper end of the vertical wall 140a. A comparison of the bracket 132 with the bracket 32 shown in the FIG. 1 embodiment will reveal that the FIG. 3 bracket and lock combination may be used in essentially the same manner as the FIG. 1 combination, the difference being that the bracket of FIG. 3 will have much greater strength and because of the extended gripping side walls 134a and 134b, both side members 20a and 20b of the truss 22 may be embraced in the manner shown in FIG. 4.

Figure 5:
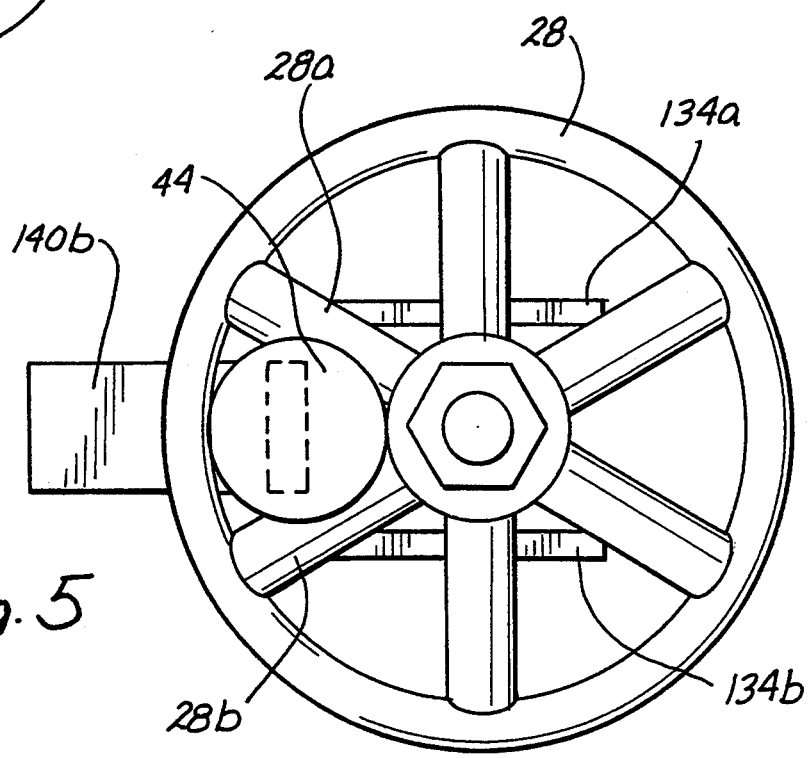
FIG. 5 is a plan view of an arrangement wherein the vertical wall of the bracket of FIG. 3 is inserted between the spokes of the wheel and radially inwardly of the wheel itself for locking with the cylindrical lock.

The embodiment shown in FIG. 5 is similar to the arrangement illustrated in FIG. 4 except that the cylindrical lock 44 is moved radially inwardly between the wheel spokes 28a and 28b.

FIG. 7 discloses the use of a disk 160 which may be interposed between the lock 44 and the wheel 28. As may be seen from FIG. 7, the disk 160 is provided with a circular opening 162 through which a spindle 24 (not shown in FIG. 7) may be passed and a slot 162 through which the vertical wall portion 140a of the bracket 132 (partially shown) inserted for capping and securing by the lock 44 in the same manner as is shown in FIG. 4.

FIG. 6 illustrates a further modification of the locking system of the present invention where a pie shaped wedge 170 is provided to fit partially between a pair of the wheel spokes 28a and 28b. This wedge 170 is slotted at 172 to allow the vertical wall 140a of the bracket 132 to be passed through it. However, in this instance, instead of being capped by a lock 44 as in the embodiments of FIGS. 1–5 inclusive, a padlock 174 having a staple 176 is employed with the staple 176 inserted through the orifice 142 in the vertical wall 140a after the latter has been pushed through the slot 172 in the wedge. It has been found in some instances that under regulations applicable to Fire Departments and other emergency services, it is not permitted to use a cylindrical lock 44 to secure a gate valve against unauthorized turning. In such cases, the brackets of the present invention may be employed with or without a disk 160 or a wedge 170, but with a padlock such as 174.

While, as previously indicated, the bracket of the embodiments illustrated in FIGS. 3-7 of the drawings operates essentially in the same manner as that illustrated in the FIGS. 1 and 2 embodiments, it will readily be appreciated that the bracket 132 provides much greater strength through its unitary molding and better gripping in that its side walls 134a and 134b can embrace both side members 20a and 20b of the gate valve truss 20. When a gate valve is secured by the bracket 132 and cylindrical lock 44, the gate valve itself has to be destroyed before any unauthorized turning can be effected.

I claim:

1. A gate valve locking combination for securing a gate valve against unauthorized turning from a predetermined setting, said gate valve comprising a housing for the valve, a bonnet capping said housing, a U-shaped truss the open ends of which U-shaped truss are secured to the bonnet and the center of which U is orificed, a valve spindle extending upwardly through the bonnet and through the orifice in the truss to project an end of said spindle above said orifice, and a spoked wheel secured on the projecting end of said spindle for opening and closing the valve upon being turned, said combination comprising a bracket said bracket having a base portion adapted to embrace at least one side of the truss, said bracket including an elongated rigid element extending angularly and upwardly from said base portion and supporting an L-shaped member, said L-shaped member comprising a horizontal shelf portion and an inner vertically rising wall portion, said wall portion being transversely orificed adjacent its upper end; and cylindrical lock means, said lock means including a cylindrical body with an upper face and a lower face, said body being slotted from its lower face toward its upper face, the slotting in said body being configured to receive the transversely orificed portion of the vertical wall of said L-shaped member, the lower face of said cylindrical body having a lower shelf parallel to its said slotting, and said cylindrical body having a transverse locking passage and a lock with a locking pin extendable through said locking passage into said slotting; and removable key means insertable into the lock in said transverse locking passage to press said pin into the slotting;

whereby when the bracket is mounted on one side of said truss and moved upwardly to place said L-shaped member against the underside and inside of the wheel between its spokes, and said cylindrical lock means is placed over the wheel with its slotting receiving the vertical wall of the L-shaped member and the orifice of the L-shaped member is aligned in register with the locking passage and the key is pushed into the lock to press the locking pin through the orifice of the L-shaped member, and the lock is locked and the key removed, the wheel of the gate valve is secured against movement relative to its truss.

2. The gate valve locking combination as described in claim 1, wherein the bracket is unitarily molded and the elongated rigid element is of approximately the same thickness as the base portion to provide rigid support for the L-shaped member.

3. The gate valve locking combination as described in claim 2, wherein the base portion comprises a horizontal forked structure formed as a pair of arms spaced apart from each other by the width of the U-shaped truss, said arms being disposed to extend horizontally to embrace both sides of the U-shaped truss.

4. A gate valve locking combination for securing a gate valve against unauthorized turning from a predetermined setting, said gate valve comprising a housing for the valve, a bonnet capping said housing, a U-shaped truss the open ends of which U-shaped truss are secured to the bonnet and the center of which U is orificed, a valve spindle extending upwardly through the bonnet and through the orifice in the truss to project an end of said spindle above said orifice and a spoked wheel secured on the projecting end of said spindle for opening and closing the valve upon being turned, said combination comprising a bracket, said bracket having a base portion adapted to embrace at least one side of the truss, said bracket including an elongated rigid element extending upwardly from said base portion and supporting a L-shaped member, said L-shaped member comprising a horizontal shelf portion and an inner vertical ring wall portion, said wall portion being adapted to protrude vertically between the spokes of the wheel, with the shelf portion abutting the underside of the wheel, and said wall portion being transversely orificed, and cylindrical lock means, said lock means including a cylindrical body with an upper face and a lower face, said body being slotted from its lower face towards its upper face, the slotting in said body being configured to receive the transversely orificed vertical wall portion of the bracket, said cylindrical body having a transverse locking passage and a lock with a locking pin extendable through said transverse locking passage into said slotting; and removable key means insertable into the lock in said transverse locking passage to press said pin into said slotting whereby, when the bracket is mounted with its arms embracing said truss and moved upwardly to dispose its shelf portion in abutment with the underside of the wheel and its vertical wall portion between the spokes of the gate valve wheel, and the cylindrical lock means is placed over the wheel with its slotting receiving the transversely orificed wall portion of the bracket and the orifice of said transversely orificed wall portion is aligned in register with the locking passage of the cylindrical lock means and the key is pushed into the lock to press the lock pin into the transverse orifice of the wall portion of the bracket and the key is removed, the wheel of the gate valve is secured against movement relative to its truss.

5. A gate valve locking combination for securing a gate valve against unauthorized turning from a predetermined setting, said gate valve comprising a housing for the valve, a bonnet capping said housing, a U-shaped truss the open ends of which U are secured to the bonnet and the center of which U is orificed, a valve spindle extending upwardly through the bonnet and through the orifice in the truss to project an end of said spindle above said orifice and a spoked wheel secured on the projecting end of said spindle for opening and closing the valve upon being turned, said combination comprising a bracket, said bracket having a base portion adapted to embrace at least one side of the truss, said bracket including an elongated rigid element extending angularly and upwardly from said base portion and supporting an L-shaped member, said L-shaped member comprising a horizontal shelf portion and an inner vertically rising wall portion, said wall portion being transversely orificed adjacent its upper end; and a disk, said disk being disposed coaxially on the valve wheel, said disk being centrally orificed to enable the top of the spindle to pass through the disk, said disk being slotted to pass the transversely orificed portion of the vertically rising wall portion of the bracket through the disk and a padlock, said padlock comprising a locking body and a U-shaped staple, one end of said staple being moveably securable within said locking body and the other end of said staple being removably securable in said locking body, said staple being inserted through the orifice in the vertically rising wall portion of the bracket whereby when the bracket is mounted over at least one side of said truss and moved upwardly to place its vertically rising wall portion of the bracket through the disk and the padlock staple is passed through the orifice of the last said wall portion and secured in the locking body, the wheel of the gate valve is secured against movement relative to the truss.

6. A gate valve locking combination for securing a gate valve against unauthorized turning from a predetermined setting, said gate valve comprising a housing for the valve, a bonnet capping said housing, a U-shaped truss the open ends of which U are secured to the bonnet and the center of which U is orificed, a valve spindle extending upwardly through the bonnet and through the orifice in the truss to project an end of said spindle above said orifice and a spoked wheel secured on the projecting end of said spindle for opening and closing the valve upon being turned, said combination comprising a bracket, said bracket having a base portion adapted to embrace at least one side of the truss, said bracket including an elongated rigid element extending angularly and upwardly from said base portion and supporting an L-shaped member, said L-shaped member comprising a horizontal shelf portion and an inner vertically rising wall portion, said wall portion being transversely orificed adjacent its upper end; and a wedge, said wedge being configured to seat between the spokes of the wheel, said wedge having a planar upper surface and being slotted to pass through it the transversely rising wall portion of the L-shaped member of the bracket; and a padlock, said padlock comprising a locking body and a U-shaped staple protruding from said locking body, one end of said staple being moveably secured in said locking body and the other end of said staple being removably secured in said locking body, said staple being passed through the transverse orifice in the upper end of the rising wall portion; whereby when said staple is passed through the transverse orifice in the upper end of the rising wall portion and secured in the locking body, the wheel of the gate valve is prevented from being turned.

* * * * *